United States Patent
Hartman

(10) Patent No.: US 8,291,720 B2
(45) Date of Patent: Oct. 23, 2012

(54) SEQUENCING OF VARIABLE SPEED COMPRESSORS IN A CHILLED LIQUID COOLING SYSTEM FOR IMPROVED ENERGY EFFICIENCY

(75) Inventor: Thomas B. Hartman, Georgetown, TX (US)

(73) Assignee: Optimum Energy, LLC, Seattle, WA (US)

( * ) Notice: Subject to any disclaimer, the term of this patent is extended or adjusted under 35 U.S.C. 154(b) by 524 days.

(21) Appl. No.: 12/364,374

(22) Filed: Feb. 2, 2009

(65) Prior Publication Data

US 2010/0198409 A1 Aug. 5, 2010

(51) Int. Cl.
*F25B 1/00* (2006.01)
*F25B 49/00* (2006.01)
*G05D 3/12* (2006.01)
*G05D 5/00* (2006.01)
*G05D 9/00* (2006.01)
*G05D 11/00* (2006.01)
*G05D 17/00* (2006.01)
*G05D 23/00* (2006.01)

(52) U.S. Cl. ............. 62/228.5; 700/289; 700/295
(58) Field of Classification Search ............ 700/4, 287, 700/289, 295; 62/115, 228.1, 228.4, 228.5; 417/2, 279

See application file for complete search history.

(56) References Cited

U.S. PATENT DOCUMENTS

| | | | | |
|---|---|---|---|---|
| 3,872,286 A | * | 3/1975 | Putman | 705/412 |
| 4,106,097 A | * | 8/1978 | Fox et al. | 700/295 |
| 4,210,957 A | | 7/1980 | Spethmann | |
| 4,463,574 A | | 8/1984 | Spethmann et al. | |
| 4,483,152 A | | 11/1984 | Bitondo | |
| 4,526,513 A | * | 7/1985 | Bogel | 417/56 |
| 4,612,776 A | | 9/1986 | Alsenz | |
| 4,646,534 A | * | 3/1987 | Russell | 62/228.4 |
| 4,679,404 A | | 7/1987 | Alsenz | |
| 4,686,834 A | * | 8/1987 | Haley et al. | 62/209 |
| 4,932,220 A | | 6/1990 | Inoue | |
| 4,951,475 A | | 8/1990 | Alsenz | |
| 5,050,397 A | | 9/1991 | Sugiyama et al. | |
| 5,097,670 A | | 3/1992 | Yoshikawa et al. | |
| 5,160,080 A | * | 11/1992 | Hines et al. | 60/774 |
| 5,222,370 A | | 6/1993 | James | |
| 5,265,434 A | | 11/1993 | Alsenz | |
| 5,301,513 A | | 4/1994 | Duff et al. | |
| 5,306,116 A | * | 4/1994 | Gunn et al. | 415/27 |
| 5,309,727 A | | 5/1994 | Duff et al. | |
| 5,327,742 A | | 7/1994 | Duff et al. | |

(Continued)

OTHER PUBLICATIONS

International Searching Authority, International Search Report and Written Opinion of the International Searching Authority for PCT/US2010/021534 filing date Jan. 20, 2010, mail date Mar. 23, 2010.

*Primary Examiner* — Crystal J Barnes-Bullock
(74) *Attorney, Agent, or Firm* — Richard C. Vershave; Foster Pepper, PLLC

(57) ABSTRACT

An improved method for sequencing variable speed centrifugal compressors on and off line to ensure optimal operating efficiency in a liquid cooling system under all operating circumstances is described. The present disclosure teaches modifying equipment sequencing decisions (to add or shed a unit), based in part on the position of the compressor inlet vanes. This new approach achieves improved energy efficiency of the overall system by taking into account operating conditions of individual compressors or chillers that may be sub-optimal.

18 Claims, 5 Drawing Sheets

U.S. PATENT DOCUMENTS

| | | | | |
|---|---|---|---|---|
| 5,343,384 A | * | 8/1994 | Fisher et al. | 700/4 |
| 5,535,814 A | | 7/1996 | Hartman | |
| 5,553,997 A | * | 9/1996 | Goshaw et al. | 415/17 |
| 5,600,960 A | * | 2/1997 | Schwedler et al. | 62/99 |
| 5,605,280 A | | 2/1997 | Hartman | |
| 5,725,148 A | | 3/1998 | Hartman | |
| 5,743,714 A | | 4/1998 | Drob | |
| 5,743,715 A | | 4/1998 | Staroselsky et al. | |
| 5,845,509 A | | 12/1998 | Shaw et al. | |
| 5,911,127 A | * | 6/1999 | Tulpule | 702/190 |
| 5,946,926 A | | 9/1999 | Hartman | |
| 6,079,626 A | | 6/2000 | Hartman | |
| 6,142,740 A | | 11/2000 | Connell | 417/2 |
| 6,185,946 B1 | | 2/2001 | Hartman | |
| 6,257,007 B1 | | 7/2001 | Hartman | |
| 6,352,106 B1 | | 3/2002 | Hartman | |
| 6,406,268 B1 | * | 6/2002 | Paice | 417/53 |
| 6,532,754 B2 | | 3/2003 | Haley | |
| 6,540,148 B1 | | 4/2003 | Salsbury | |
| 6,557,361 B1 | | 5/2003 | Howard | |
| 6,602,057 B2 | * | 8/2003 | Saxena et al. | 417/286 |
| 6,607,140 B1 | | 8/2003 | Hartman | |
| 6,666,042 B1 | | 12/2003 | Cline | |
| 6,718,779 B1 | | 4/2004 | Henry | |
| 6,769,258 B2 | * | 8/2004 | Pierson | 60/772 |
| 6,792,765 B2 | | 9/2004 | Domnick | |
| 6,826,917 B1 | | 12/2004 | Bodell, II et al. | |
| 6,938,433 B2 | * | 9/2005 | Bash et al. | 62/229 |
| 7,028,768 B2 | | 4/2006 | Aler | |
| 7,094,019 B1 | * | 8/2006 | Shapiro | 415/27 |
| 7,762,081 B2 | * | 7/2010 | Williams | 60/772 |
| 7,856,834 B2 | * | 12/2010 | Haley | 62/115 |
| 2006/0216159 A1 | * | 9/2006 | Raghavachari | 417/279 |
| 2007/0144193 A1 | * | 6/2007 | Crane et al. | 62/228.4 |
| 2009/0012653 A1 | * | 1/2009 | Cheng et al. | 700/287 |
| 2010/0180629 A1 | * | 7/2010 | Ueda et al. | 62/498 |
| 2011/0048046 A1 | * | 3/2011 | Sommer et al. | 62/228.1 |

* cited by examiner

SEQUENCING OF VARIABLE SPEED COMPRESSORS IN A CHILLED LIQUID COOLING SYSTEM FOR IMPROVED ENERGY EFFICIENCY

TECHNICAL FIELD

This invention pertains to the field of heating, ventilation and air-conditioning ("HVAC") systems and, more specifically, pertains to improved strategies, especially automated or software-implemented methods, for sequencing parallel equipment such as centrifugal chillers, pumps and fans in order to improve the overall operating efficiency of HVAC systems that incorporate such equipment.

BACKGROUND

Chilled water plants are employed to provide cooling for building comfort loads and for industrial process loads and are a major user of electrical power. Chilled water plants generally employ multiple chillers, and some chillers employ multiple compressors. This permits equipment to be staged to meet the changing loads, which usually vary from very low loading up to as much as 100% of plant capacity, depending on design and operating environment. Multiple chillers also permit designs that incorporate fail safe operation with backup available in case of a failure of one of the machines.

Medium and large size cooling plants often incorporate centrifugal compressors due to their superior operating efficiency and larger capacities. A chiller consists of one or more compressors mounted on a set of heat exchangers which, along with additional piping, refrigerant and other equipment, cools a fluid that flows through one heat exchanger while rejecting the heat absorbed at a higher temperature to a fluid flowing through the second heat exchanger. The fluid flowing through both heat exchangers is usually water. Each set of one or more compressors and two heat exchangers is called a chiller, and medium to large chiller plants consist of multiple chillers.

FIG. 5 is a simplified diagram of components of a conventional water chiller plant with four chillers (501-504) arranged in parallel and connected to chilled water pumping and piping system (520). Each chiller has an individual chiller controller (531-534) each of which is in communication with a controller (540). The individual chiller controllers may communicate via a network such as an Ethernet network. The central controller preferably has a processer and associated memory which are configured to read a computer program. The central controller may be a digital computing system, for example, a personal computer or a programmable logic controller. The central controller is configured to receive information from each individual chiller such as head pressure readings, fluid temperatures and the current vane settings. The central controller also controls various aspects of the chiller plant including pump speed, chiller loading and switching a chiller on or offline.

FIG. 1 illustrates the major components of a variable speed centrifugal chiller. Medium and large chiller plants typically employ from two to as many as a dozen or more such chillers for comfort conditioning applications or to serve process cooling needs in a manufacturing application. In a typical water chiller plant with variable speed centrifugal chillers, each chiller has one or more motor/compressor unit (109), which may be a hermetic type or open type. The motor or engine that drives the compressor is powered by a power unit commonly called a variable speed drive (110) that can vary the rotational speed of the motor or engine in the compressor unit.

Each compressor draws low pressure refrigerant gas from the cooler (111) through a connection (112), compresses it, and discharges it as a higher pressure hot gas through a connection (113) into the condenser (114). In the condenser, hot gaseous refrigerant is condensed into a liquid by rejecting heat to condenser water that is supplied through a piping connection (140) from a cooling tower or some other means of conducting heat from the fluid. The condenser water flows through tubes in the condenser, absorbs heat from the refrigerant and cools it to a high pressure liquid. The heated condenser water then leaves the condenser through a piping connection (141) to return to the cooling tower or other method of heat rejection.

The condensed liquid refrigerant then flows through an expansion device (133) that regulates the flow of refrigerant into the cooler (111), which is held at a low pressure by the operation of the compressor continuously drawing expanded gaseous refrigerant from it. The low pressure environment causes the refrigerant to change state to a gas and as it does so, it absorbs the required heat of vaporization from the chilled water circulating into the cooler via pipe connection (151), then through tubes in the cooler where the boiling refrigerant absorbs heat from the chilled water and the chilled water then exits through a pipe connection (152) at the desired temperature to cool the comfort or process loads to which the chiller plant is connected. The low pressure vapor is drawn into the inlet of the compressor and the cycle is continuously repeated. The chilled and condenser water are typically circulated by pumps not shown. Control of all elements within the chiller is provided by an on-board control panel (162). Though the configuration of many chillers is similar to that shown in FIG. 1, there are variations to this basic design.

FIG. 2 is a cross section that shows in some greater detail the elements of the motor/compressor unit (see 109, 110 in FIG. 1) of a centrifugal compressor used in centrifugal chillers. The compressor unit consists of a motor or engine (210) that rotates a shaft upon which an impeller (212) is mounted that rotates within a housing (214). The compressor inlet (216) is connected to the evaporator (not shown) which may be configured in a number of variations. As the gas to be compressed, which is called "refrigerant," is drawn into the compressor by the rotation of the impeller, it must first pass through inlet vanes (218) which are segmented. The vanes are closed and opened by coordinated rotation of each segment around its central axis (shown as a vertical axis in FIG. 2). We call this rotational position the current vane position or setting. When closed, only a small hole in the center of the segments is open for gas to pass. When the vanes are set to open, virtually the entire inlet area is open. As the vanes begin to close from full-open; their coordinated movement causes the gas flowing by to be rotated in the direction of the rotation of the compressor impeller (212). This rotational movement of the gas entering the compressor impeller which is rotating in the same direction reduces the flow into and through the impeller. As the vanes continue to close, the vanes further reduce the flow of refrigerant into the compressor inlet by creating a pressure difference across the vanes. The impeller draws the gas in at low pressure and imparts energy to the gas to discharge it at a higher pressure in the volute (220) of the housing (222) where it is collected and routed to the condenser.

Variable speed compressors can reduce their operating capacity in two ways, first, by closing the inlet vanes as described above, and second, by slowing the speed of the compressor impeller. However, impeller rotational speed must always be maintained sufficiently high to maintain the flow of refrigerant gas through the impeller at the current pressure difference between the condenser and evaporator of the chiller. If the speed falls below a minimum speed that depends on this pressure difference across the impeller, the impeller will stall and flow will abruptly stop. The phenomenon in chillers is called "surging." The impeller stalls and flow stops, this reduces the pressure difference and flow restarts only to stall again. Surging results in inefficient operation and can under some circumstances cause damage to elements of the compressor.

To ensure surging does not develop, the internal chiller or compressor controls of variable speed chillers incorporate some method of maintaining a minimum compressor speed that is usually based on the pressure across the impeller. When operating conditions require a certain pressure differential across the compressor (commonly called compressor "head") such that the impeller speed cannot be reduced due to a risk of stalling and surging, and at the same time a lower capacity is required from the chiller, then instead of slowing the speed of the impeller to reduce capacity, the impeller is maintained at the appropriate minimum speed and the vanes are closed to reduce the capacity, sacrificing efficiency of the chiller.

There is a need for improvement in operating efficiency of systems of the type described above.

SUMMARY

As compressor inlet vanes close beyond a certain point, overall compressor efficiency is reduced due to losses caused by the effect of the vanes on the flow into the inlet of the compressor. In accordance with one aspect of the present invention, in a variable speed compressor, the vane settings and the compressor (impeller) speed are coordinated so as to maintain a desired cooling capacity at current compressor head conditions. The vanes are employed to reduce capacity when compressor speed cannot be reduced due to the risk of an impeller stall condition. According to another aspect of the present invention, namely, an improved method of compressor sequencing, a current setting of the compressor vanes is employed in the decision to add or shed compressors, or to add or shed chilling units with single compressors, so that overall system capacity is achieved with optimal efficiency.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
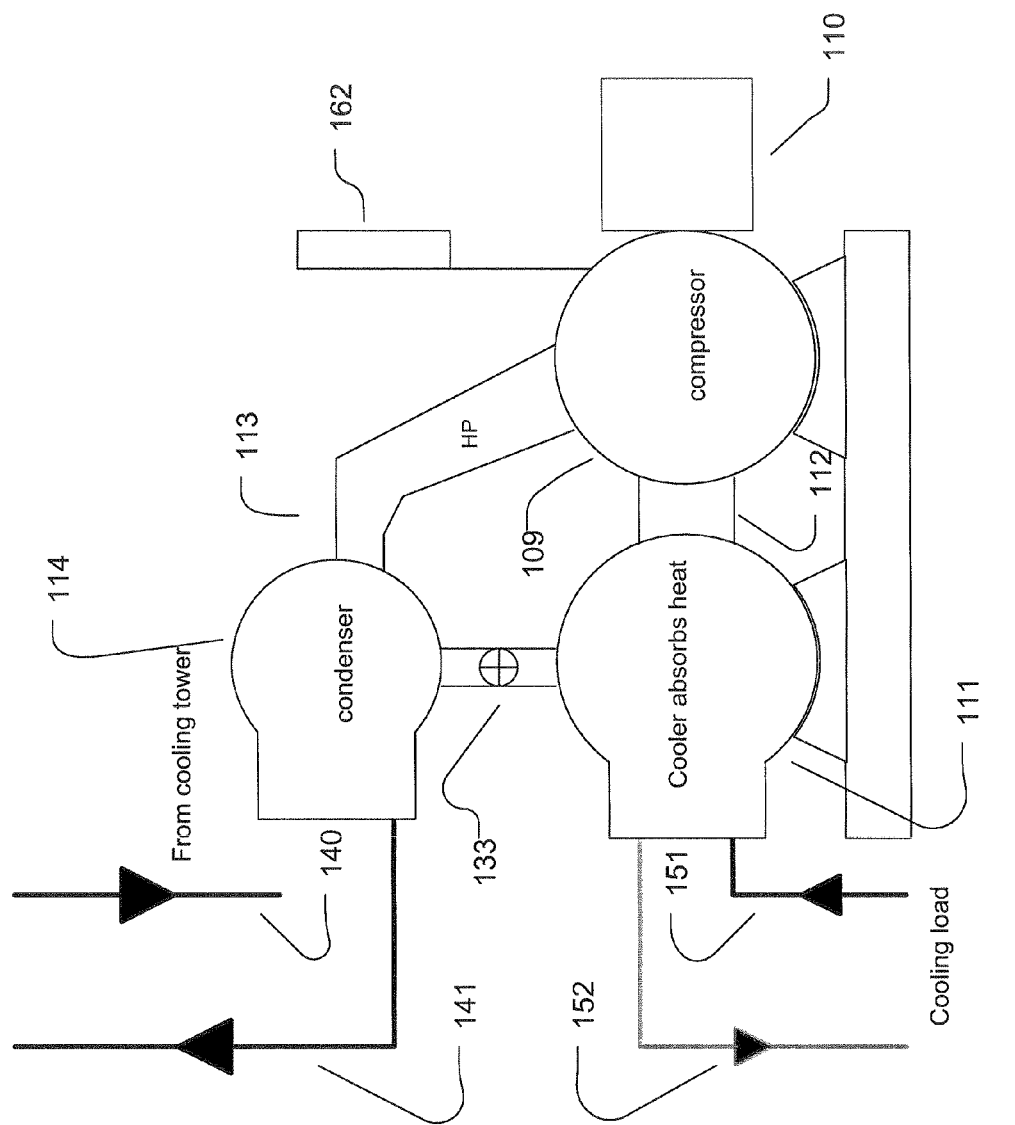
FIG. 1 is a diagram that shows the basic elements of a centrifugal chiller.
Figure 2:
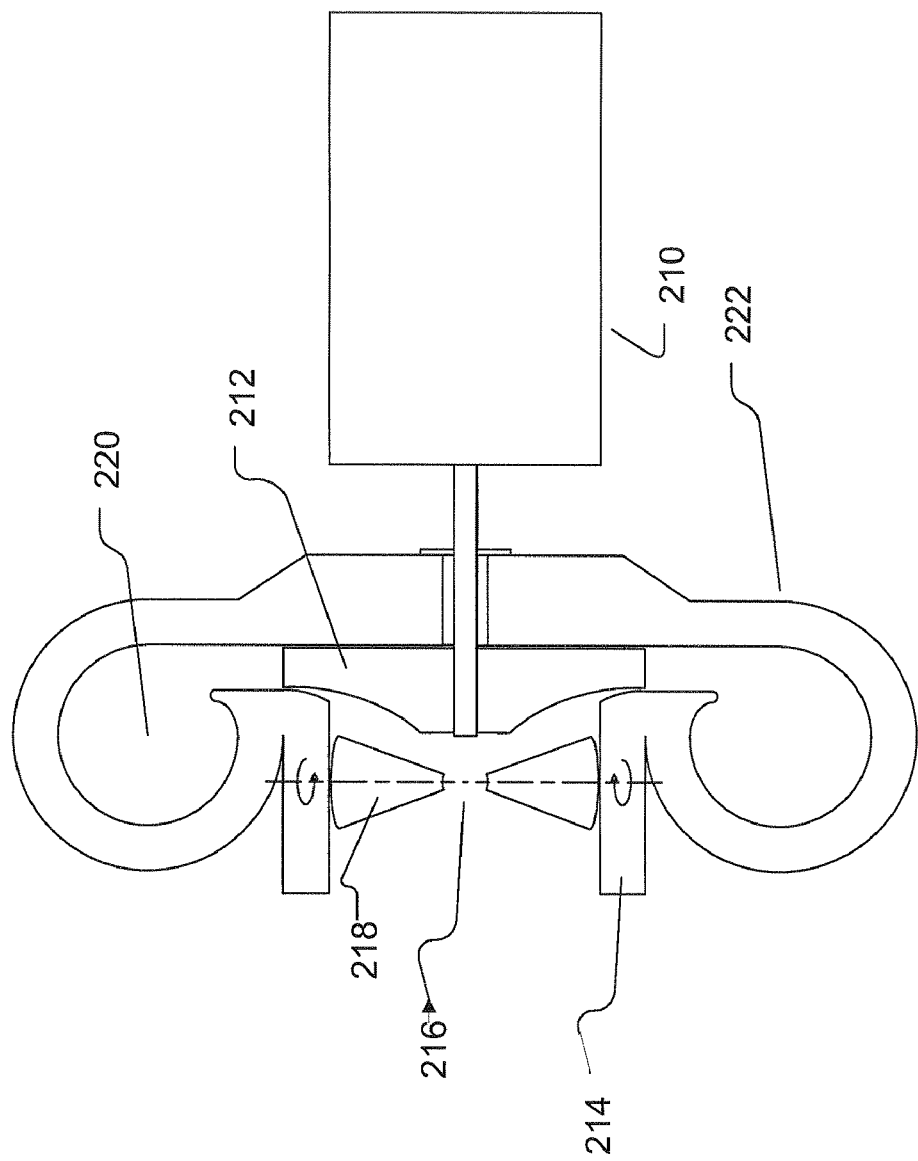
FIG. 2 is a diagram that shows the elements of typical variable speed centrifugal compressors.

Because chillers that provide chilled water for comfort conditioning or process cooling are normally subject to very wide variations in cooling loads, the ability to adjust capacity of individual chillers along with a method of sequencing chillers or compressors on and off line is employed to accommodate load changes and achieve efficient plant operation. In prior art, the control of the capacity of each individual chiller is accomplished by internal chiller or compressor controls that maintain a predetermined temperature of the chilled water leaving the unit.

The control of the number of chillers or compressors on line is dynamically accomplished by separate control algorithms, generally based on the loading or power draw of the online compressors. See my U.S. Pat. No. 6,185,946 in which sequencing is based on comparing current point of operation to the curve of optimal efficiency, called the natural curve, of the device. Other methods are known, but these known methods do not account for characteristics of the internal controls that may result in a variation of compressor speed and vane control such that a point of operation is actually less efficient than expected.

That is what is new and is the focus of this invention, the use of the inlet vane position of one or more of the online chiller compressors to operate, adjust, or modify the algorithm that is employed to reduce the number of online chillers.

It is known that all variable speed compressors have a property called a natural curve which is the curve of points of compressor capacity at which optimum compressor operating efficiency is achieved as a function of compressor head conditions. It is also known that the compressor head is a function of the chilled water and condenser water temperature and flow conditions and that the natural curve property can be applied to the entire chiller as a function of condenser water and chilled water temperature. Furthermore, it is known that the pumps, fans, and any other power consuming equipment typically incorporated into chiller plants also have natural curves. For optimal plant operation, the number and relative loading of chiller plant chillers, pumps, cooling towers, etc., depends not only on the plant loading, but also on the current operating conditions under which the plant must operate, most notably the ambient outdoor conditions to which the heat is rejected and the temperature at which the chilled water is supplied.

Using this information, it is possible to construct tables or algorithms that are applied to select the correct number of chillers to operate in the plant optimally under all possible load and external operating conditions. A detailed description of such an optimal chiller sequencing algorithm is provided in U.S. Pat. No. 6,185,946 B1. However, in some instances it is found that the internal controls of the chiller, or the compressors on the chiller, cause the compressor to act to conditions somewhat differently than may be expected. In such instances, actual points of operation may be less efficient than expected. In other instances the exact characteristics of the compressor (called a compressor map) are not available or are uncertain so that the natural curve of the compressor and therefore the chiller cannot be determined with certainty. While there may be a number of reasons for the compressors to operate differently than might be expected, the loss of efficiency in such situations is commonly caused by the internal controls of the compressor operating the speed of the compressor at a speed that is higher than expected, and the vanes of the compressor less open than expected. In such situations by monitoring the vanes, and in some instances the speed, of the operating compressors, then when the vanes are determined to be opened beyond a threshold value at a point at which a compressor or chiller would normally be added; similarly when the vanes are determined to be closed beyond a threshold value at a point at which the compressor or chiller would normally be shed, and using that information to automatically adjust the nominal algorithm controlling the adding or shedding of compressor and/or chiller stages in order to ensure plant operating efficiency is kept as high as possible. This is the new method of control that is the basis of this invention.

The present invention discloses a new means of adjusting and improving the optimized sequencing techniques discussed in prior art. In such art, the sequencing of chillers is intended to ensure the total energy use for the chillers and heat rejection systems is continuously optimized. Chillers are sequenced on and off to keep the on-line equipment operating at all times as close as possible to the natural curve of that equipment which is the point of highest operating efficiency at the load condition. With this new method, the previous methods can be more easily implemented and then automatically adjusted ensuring sequencing does result in optimum plant efficiency. Selection of the number of chillers or compressors online is aimed at maintaining the desired plant capacity while optimizing the overall energy use of the system.

Figure 3:
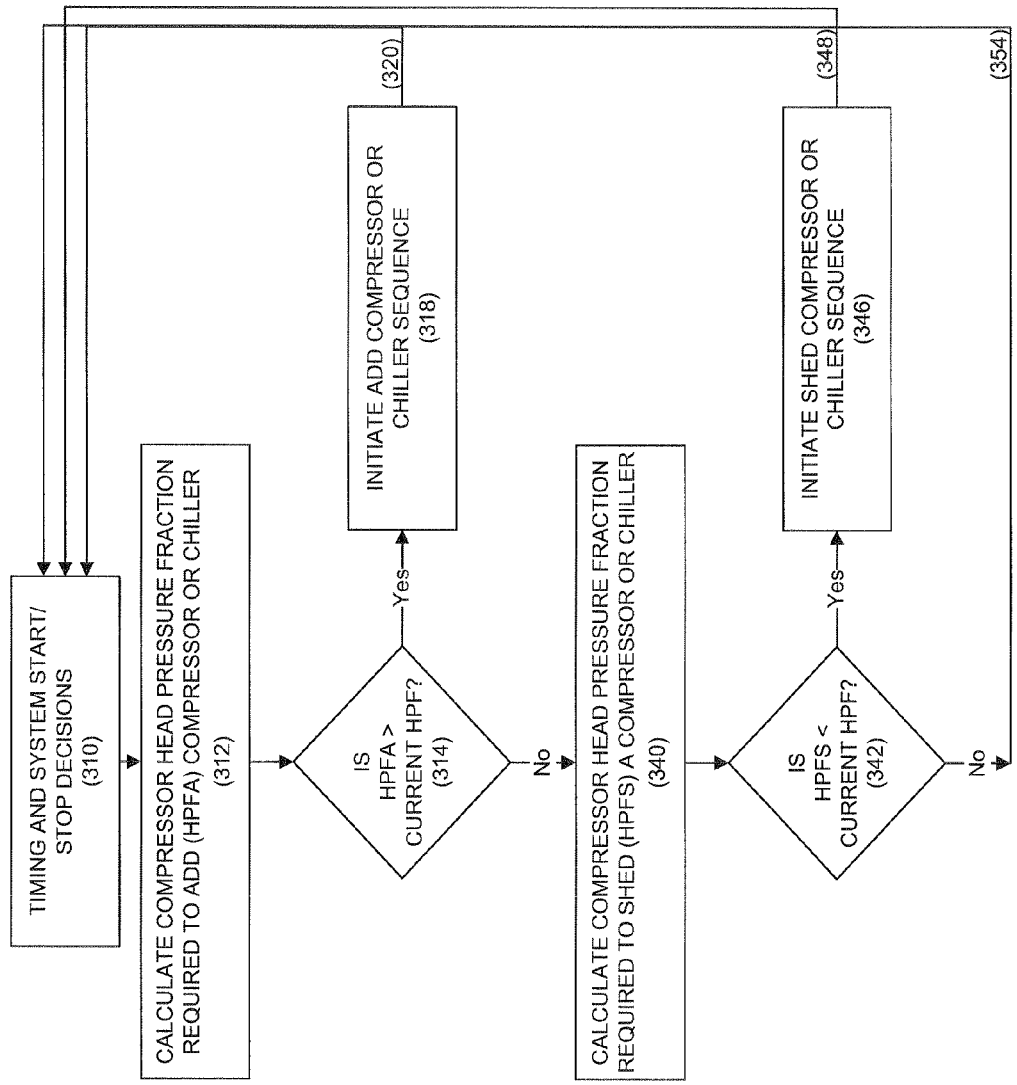
FIG. 3 depicts a simple compressor or chiller add and shed decision flow chart that reflects prior art.
Figure 4:
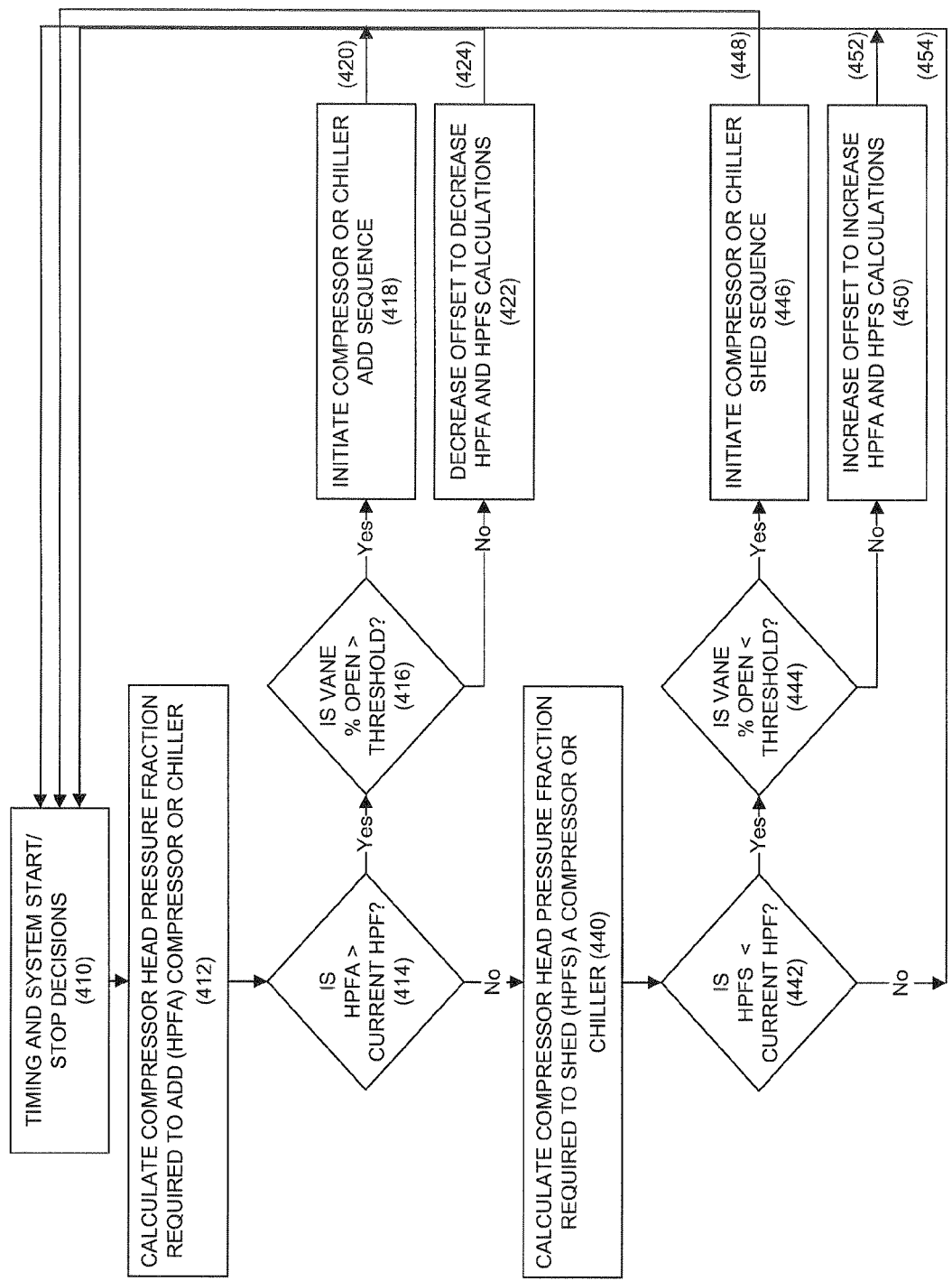
FIG. 4 is an example of a decision flow chart that reflects an embodiment of the present invention.
Figure 5:
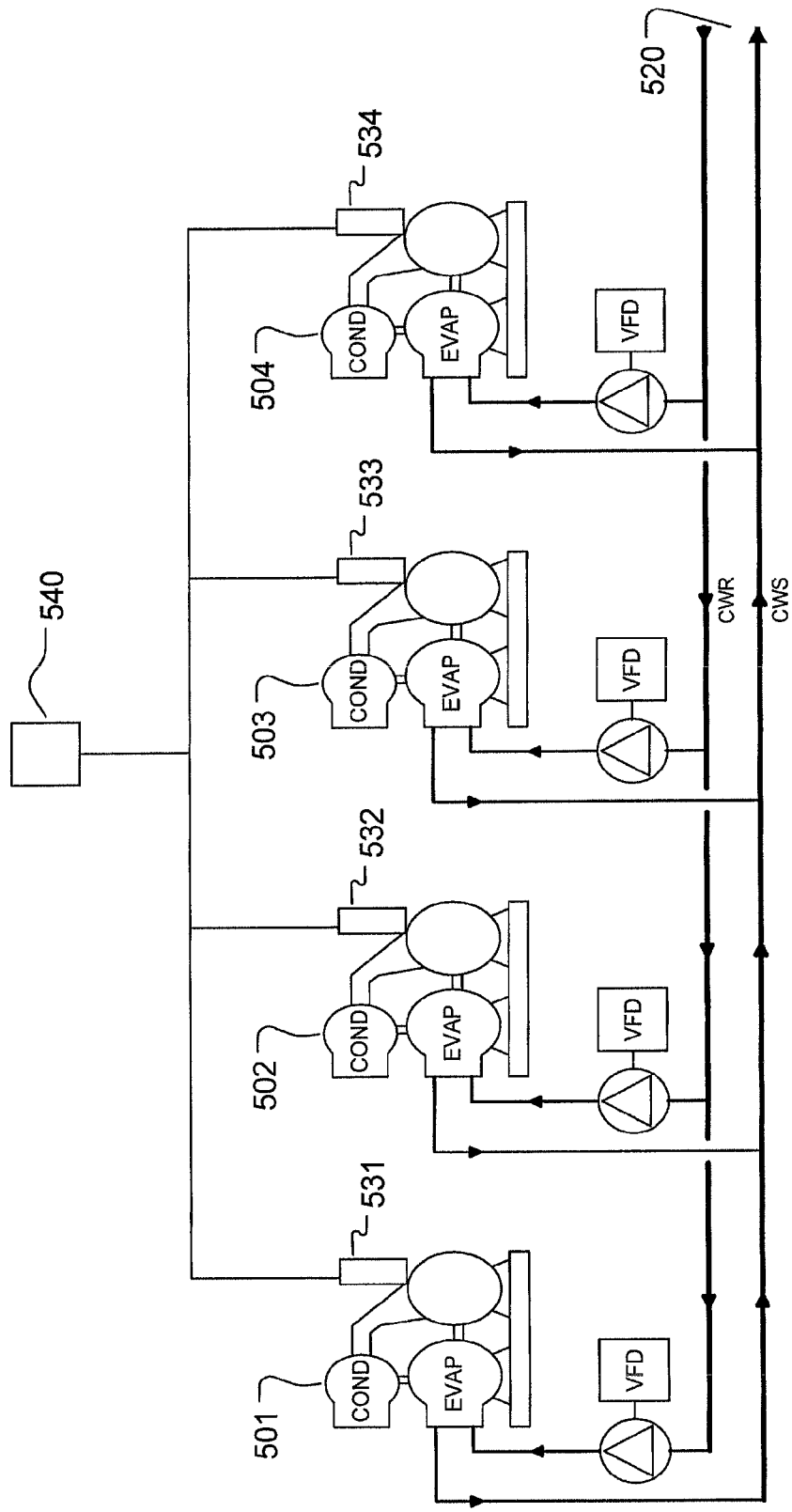
FIG. 5 is a simplified block diagram of a chiller plant.

A chiller sequencing flow chart for a plant employing one method (the natural curve method) of optimal chiller/compressor sequencing is shown in FIG. 3. The enhanced method using this invention is shown in FIG. 4. FIG. 3 illustrates a portion of the logic used to control the adding and subtracting of chillers or compressors in response to changing operating conditions. In this case it is the natural curve method of sequencing chillers which is based on calculated head pressure fractions and other current operating factors where the head pressure fraction is the ratio of the average current compressor head pressures compared to the design maximum for the operating compressor(s). The head pressure fractions may also be developed directly from the condenser and evaporator refrigerant temperatures or from the condensing and chilled water temperatures. In FIG. 3 as the control logic is executed, the calculated compressor head pressure to add a compressor or chiller is made (312). This value is compared with the current head pressure fraction (314). If the calculation of the head pressure fraction of the existing system is greater than the current operating requirements, then a chiller or compressor is added to bring the system closer to its natural curve (318) and the remainder of the sequencing process is bypassed (320). If it is not, then the next step is to calculate the head pressure fraction to shed a chiller or compressor (340). This is then compared to the current operating head pressure fraction (342) and if it is less than this current operating value, then a compressor or chiller is shed (346) before returning (348) to a start location (310) of the process. If no action is taken during this execution of the program, then the process is ended (354) and returned to the starting location (310).

This present invention adds to the prior art with improvements to the decision process for adding or shedding chillers regardless of the basic approach to optimized sequencing. FIG. 4 is a chiller and/or compressor sequencing flow chart for a chiller plant consisting of multiple chillers and/or multiple compressors on each chiller wherein the natural curve sequencing method of FIG. 3 has been enhanced with the method disclosed in this new invention. A starting location (410) for the sequencing decision path is to calculate the current HPFA value (412) and to compare this value with the current HPF (414) of the operating chillers and/or compressors to see if adding a compressor or chiller is desired. If the HPFA calculation is greater than the current HPF conditions, then it means the head conditions and capacity requirements are such that the online compressors are likely operating above their natural curves. In this operation, the compressors are at speeds above their most efficient for the current conditions to meet the capacity requirements. Thus, adding a compressor or chiller will reduce the speed requirements for each online compressor or chiller so the compressors will operate closer to their natural curve and plant efficiency will be improved.

If the value of HPFA is greater than that of HPF, indicating a need to add a chiller or compressor, then this invention adds a step before doing so. A check is made of the vane position (416). If the vane is substantially closed such that a loss of efficiency is occurring due to the vane restrictions, then the online compressors are shown to be operating at their restricted minimum speed and adding a chiller will only require additional vane closure to reduce the capacity of each. This would further reduce compressor operating efficiency. In this case, instead of initiating the chiller add sequence, this information is employed to apply a mathematical offset or adjustment to the calculations to decrease the HPFA and HPFS calculations in the future (422) before returning (424) to the starting location (410). However, if the vanes are substantially open beyond a point of reduced efficiency, then the chiller add sequence is initiated (418) before returning (420) to the starting location (410).

If the HPFA calculation is not larger than the current HPF value, then the program continues to the HPFS calculation (440), which is made and the result is compared to the current HPF value to see if a compressor or chiller shed action should be taken. If the HPFS calculation is less than the current HPF value (442), it means the online compressors are likely operating below their natural curves. If the HPFS calculation is greater than or equal to the current HPFS value then the program returns (454) to the starting location (410). If the HPFS calculation is less than the current HPF value then the online compressors are likely to be restricted by minimum speed, and their capacity is being controlled by closure of the inlet vanes. Thus, shedding a compressor or chiller will increase the capacity requirements for each online compressor or chiller so that vanes will open and plant efficiency will be improved by moving the operating point of the active chillers closer to their natural curve. However, with this invention, before shedding a chiller, a check is made of the vane position (444). If the vanes are already open such that they are not encumbering the compressors with a loss of efficiency, then the online compressors are shown not to be operating below their natural curve and are not restricted by minimum speed. In this event shedding a chiller will only require the compressor speed to be raised to serve additional capacity requirements of each and operate further below their natural curves, reducing compressor operating efficiency. In this case instead of initiating the chiller shed sequence, this information is employed to apply a mathematical offset or adjustment to the calculations to increase the HPFA and HPFS calculations in the future (450) before returning (452) to the starting location (410). However, if the vanes are substantially closed beyond a point of reduced efficiency, then the chiller shed sequence is initiated (446) before returning (448) to the starting location (410) of the program for the next execution cycle.

This is a simple embodiment of the invention. However, there are many other means of implementing this invention. For example, a nominal model of compressor speed and vane position may be continuously calculated and then compared with the actual values of the compressor speed and vane position to develop a "map" of each compressor and then the continuously updated map employed to ensure sequencing for optimal efficiency in a simple sequence flow similar to that shown in FIG. 3.

The invention described above may be carried out by a digital computing system. By the term digital computing system we mean any system that includes at least one digital processor and associated memory, wherein the digital processor can execute instructions or "code" stored in that memory. (The memory may store data as well.) A digital processor includes but is not limited to a microprocessor, multi-core processor, DSP (digital signal processor), processor array, network processor, etc. A digital processor may be part of a larger device such as a laptop or desktop computer, a PDA, cell phone, iPhone PDA, Blackberry® PDA/phone, or indeed virtually any electronic device.

The associated memory, further explained below, may be integrated together with the processor, for example RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a suitable digital processor as further explained below for the benefit of the USPTO.

This invention may be implemented or embodied in computer software (also known as a "computer program" or "code"; we use these terms interchangeably). Programs, or code, are most useful when stored in a digital memory that can be read by a digital processor. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, mini-computer, desktop or even laptop computer. Rather, we use the term to mean that the storage medium is readable by a digital processor or any digital computing system. Such media may be any available media that is locally and/or remotely accessible by a computer or processor, and it includes both volatile and non-volatile media, removable and non-removable media.

Where a program has been stored in a computer-readable storage medium, we may refer to that storage medium as a computer program product. For example, a portable digital storage medium may be used as a convenient means to store and transport (deliver, buy, sell, license) a computer program. This was often done in the past for retail point-of-sale delivery of packaged ("shrink wrapped") programs. Examples of such storage media include without limitation CD-ROM and the like. Such a CD-ROM, containing a stored computer program, is an example of a computer program product.

It will be obvious to those having skill in the art that many changes may be made to the details of the above-described embodiments without departing from the underlying principles of the invention. The scope of the present invention should, therefore, be determined only by the following claims.

The invention claimed is:

1. A method of sequencing chillers to meet a variable cooling load in a chiller plant having a plurality of available chillers, each available chiller including a variable speed centrifugal compressor having an adjustable inlet vane, the method comprising the steps of:
   determining which of the available chillers are currently online;
   for each of the currently online chillers, monitoring a current setting of the inlet vane of a corresponding variable speed centrifugal compressor;
   adding a chiller based at least in part on the current settings of the inlet vanes of the compressors of the currently online chillers;
   adding a chiller if a current pressure differential across compressors of the online chillers is less than a calculated value at which a chiller is normally added; and
   adding a chiller if the settings of the inlet vanes are open above a predetermined threshold value.

2. A method of sequencing chillers to meet a variable cooling load in a chiller plant having a plurality of available chillers, each available chiller including a variable speed centrifugal compressor having an adjustable inlet vane, the method comprising the steps of:
   determining which of the available chillers are currently online;
   for each of the currently online chillers, monitoring a current setting of the inlet vane of a corresponding variable speed centrifugal compressor;
   adding a chiller based at least in part on the current settings of the inlet vanes of the compressors of the currently online chillers; and
   adjusting a calculated value at which a chiller is normally added if the inlet vanes are open less than a predetermined threshold value.

3. The method of claim 2 further comprising modifying compressor speed so as to maintain respective speeds of all online compressors above a predetermined minimum speed at all times.

4. The method of claim 2 wherein a decision to add or shed a chiller includes monitoring the speed of the centrifugal compressors; monitoring the settings of the inlet vanes; and adding a chiller based in part on the speed of the centrifugal compressors and the settings of the inlet vanes.

5. A method of sequencing variable-speed centrifugal compressors in a chiller system having a plurality of available compressors, each available compressor having an adjustable inlet vane, the method comprising the steps of:
   determining which of the available compressors are currently online;
   for each of the currently online compressors, monitoring a current setting of the inlet vane;
   shedding a compressor based at least in part on the current settings of the inlet vanes of the currently online compressors;
   shedding a compressor if the current pressure differential across the online compressors is greater than a calculated value at which a compressor is normally shed; and
   shedding a compressor if the settings of the inlet vanes are below a predetermined threshold value.

6. A method of sequencing variable-speed centrifugal compressors in a chiller system having a plurality of available compressors, each available compressor having an adjustable inlet vane, the method comprising the steps of:

determining which of the available compressors are currently online;

for each of the currently online compressors, monitoring a current setting of the inlet vane;

shedding a compressor based at least in part on the current settings of the inlet vanes of the currently online compressors; and adjusting a calculated value at which a compressor is normally shed if the inlet vanes are open above a predetermined threshold value.

7. The method of claim 6 further comprising modifying compressor speed so as to maintain respective speeds of all online compressors above a predetermined minimum speed at all times.

8. The method of claim 6 wherein a decision to add or shed a compressor includes monitoring the speed of the centrifugal compressors; monitoring the settings of the inlet vanes; and shedding a compressor based in part on the speed of the centrifugal compressors and the settings of the inlet vanes.

9. A method of sequencing chillers to meet a variable cooling load in a chiller plant having a plurality of available chillers, each available chiller including a variable speed centrifugal compressor having an adjustable inlet vane, the method comprising the steps of:

determining which of the available chillers are currently online;

for each of the currently online chillers, monitoring a current setting of the inlet vane of a corresponding variable speed centrifugal compressor; and adding or shedding a chiller based at least in part on the current settings of the inlet vanes of the compressors of the currently online chillers; wherein adding or shedding the chiller includes shedding the chiller if the inlet vanes are open less than a predetermined threshold value.

10. The method of claim 9 adding or shedding the chiller includes determining if a current pressure differential across compressors of the online chillers is greater than a calculated value at which a chiller is normally shed.

11. The method of claim 9 further comprising modifying a compressor speed to maintain respective speeds of all online compressors above a predetermined minimum speed at all times.

12. The method of claim 9 wherein adding or shedding the chiller includes monitoring the speed of the centrifugal compressors; monitoring the settings of the inlet vanes; and adding the chiller based in part on the speed of the centrifugal compressors and the settings of the inlet vanes.

13. A method of sequencing chillers to meet a variable cooling load in a chiller plant having a plurality of available chillers, each available chiller including a variable speed centrifugal compressor having an adjustable inlet vane, the method comprising the steps of:

determining which of the available chillers are currently online;

for each of the currently online chillers, monitoring a current setting of the inlet vane of a corresponding variable speed centrifugal compressor;

adding or shedding a chiller based at least in part on the current settings of the inlet vanes of the compressors of the currently online chillers; and adjusting a calculated value at which a chiller is normally shed if the inlet vanes are open less than a predetermined threshold value.

14. A method of sequencing variable-speed centrifugal compressors in a chiller system having a plurality of available compressors, each available compressor having an adjustable inlet vane, the method comprising the steps of:

determining which of the available compressors are currently online;

for each of the currently online compressors, monitoring a current setting of the adjustable inlet vane; and adding or shedding a compressor based at least in part on the current settings of the inlet vanes of the currently online compressors, wherein adding or shedding the compressor includes shedding the compressor if the settings of the inlet vanes are open more than predetermined threshold value.

15. The method of claim 14 wherein adding or shedding the compressor includes determining if a current pressure differential across the online compressors is less than a calculated value at which a compressor is normally added.

16. The method of claim 14 further comprising modifying compressor speed to maintain respective speeds of all online compressors above a predetermined minimum speed.

17. The method of claim 14 wherein adding or shedding the compressor includes monitoring the speed of the centrifugal compressors; monitoring the settings of the inlet vanes; and shedding the compressor based in part on the speed of the centrifugal compressors and the settings of the inlet vanes.

18. A method of sequencing variable-speed centrifugal compressors in a chiller system having a plurality of available compressors, each available compressor having an adjustable inlet vane, the method comprising the steps of:

determining which of the available compressors are currently online;

for each of the currently online compressors, monitoring a current setting of the adjustable inlet vane;

adding or shedding a compressor based at least in part on the current settings of the inlet vanes of the currently online compressors; and adjusting a calculated value at which a compressor is normally added if the inlet vanes are open less than a predetermined threshold value.

* * * * *